US012746511B2

(12) United States Patent
Hotta et al.

(10) Patent No.: US 12,746,511 B2
(45) Date of Patent: Sep. 29, 2026

(54) FEEDSTOCK SOLUTION FLOW CONCENTRATION SYSTEM

(71) Applicant: Asahi Kasei Kabushiki Kaisha, Tokyo (JP)

(72) Inventors: Daisuke Hotta, Tokyo (JP); Mitsuru Fujita, Tokyo (JP); Masato Mikawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/224,806

(22) Filed: Jul. 21, 2023

(65) Prior Publication Data

US 2023/0356149 A1 Nov. 9, 2023

Related U.S. Application Data

(62) Division of application No. 17/269,645, filed as application No. PCT/JP2019/034656 on Sep. 3, 2019, now abandoned.

(30) Foreign Application Priority Data

Sep. 3, 2018 (JP) ................................ 2018-164444

(51) Int. Cl.
*B01D 61/00* (2006.01)
*B01D 61/36* (2006.01)
(Continued)

(52) U.S. Cl.
CPC ......... *B01D 61/005* (2013.01); *B01D 61/002* (2013.01); *B01D 61/364* (2013.01);
(Continued)

(58) Field of Classification Search
None
See application file for complete search history.

(56) References Cited

U.S. PATENT DOCUMENTS 3,707,231 A 12/1972 Bradley
6,187,200 B1 2/2001 Yamamura et al.
(Continued)

FOREIGN PATENT DOCUMENTS

AU 2015227384 A1 10/2015
CN 1132108 A 10/1996
(Continued)

OTHER PUBLICATIONS

Kim et al Desalination 352 (2014) 128-135 (Year: 2014).*
(Continued)

*Primary Examiner* — Krishnan S Menon
(74) *Attorney, Agent, or Firm* — Morgan, Lewis & Bockius LLP

(57) ABSTRACT

A feedstock solution flow concentration system, which has a first step for counterflowing or parallel flowing a feedstock solution flow a containing a solute and a solvent b, and a draw solution flow d via a forward osmosis membrane o and transferring the solvent b in the feedstock solution flow a to the draw solution flow d to obtain a concentrated feedstock solution flow c, which is the feedstock solution flow which has been concentrated, and a diluted draw solution flow e, which is the draw solution flow which has been diluted.

22 Claims, 2 Drawing Sheets

(51) Int. Cl.

| | |
|---|---|
| ***B01D 61/58*** | (2006.01) |
| ***B01D 71/56*** | (2006.01) |
| ***C12G 1/00*** | (2019.01) |
| ***C12H 1/07*** | (2006.01) |

(52) U.S. Cl.

CPC .......... *B01D 61/366* (2013.01); *B01D 61/58* (2013.01); *B01D 71/56* (2013.01); *C12G 1/00* (2013.01); *C12H 1/063* (2013.01); *B01D 2317/025* (2013.01)

(56) References Cited

U.S. PATENT DOCUMENTS

| | | | | |
|---|---|---|---|---|
| 2011/0203994 | A1* | 8/2011 | McGinnis .......... | B01D 61/0023 210/650 |
| 2013/0248447 | A1 | 9/2013 | Ikeda et al. | |
| 2017/0211885 | A1 | 7/2017 | Honda | |
| 2017/0232392 | A1 | 8/2017 | Desormeaux et al. | |

FOREIGN PATENT DOCUMENTS

| | | | |
|---|---|---|---|
| JP | S54-119096 | A | 9/1979 |
| JP | 2012-091166 | A | 5/2012 |
| JP | 2016-150308 | A | 8/2016 |
| KR | 2016-0080376 | A | 7/2016 |
| WO | 87/02380 | A1 | 4/1987 |
| WO | 2016/021337 | A1 | 2/2016 |
| WO | 2016/210337 | A2 | 12/2016 |

OTHER PUBLICATIONS

International Search Report issued in corresponding International Patent Application No. PCT/JP2019/034656 dated Dec. 3, 2019.

International Preliminary Report on Patentability and Written Opinion issued in corresponding International Patent Application No. PCT/JP2019/034656 dated Mar. 9, 2021.

Supplementary European Search Report issued in corresponding European Patent Application No. 19858386.6 dated Aug. 26, 2021.

Wang et al., "Integrated forward osmosis-membrane distillation (FO-MD) hybrid system for the concentration of protein solutions," Chemical Engineering Science, 66 (11): 2421-2430 (2011).

Law et al., "Multiple-solute salts as draw solution for osmotic concentration of succinate feed by forward osmosis," Journal of Industrial and Engineering Chemistry, 51: 264-270 (2017).

Johnson et al., "Osmotic's potential: An overview of draw solutes for forward osmosis," Desalination, 434: 100-120 (2017).

Chou et al., "Thin-film composite hollow fiber membranes for pressure retarded osmosis (PRO) process with high power density," Journal of Membrane Science, 389: 25-33 (2012).

* cited by examiner

FEEDSTOCK SOLUTION FLOW CONCENTRATION SYSTEM

FIELD

The present invention relates to a feedstock solution flow concentration system.

BACKGROUND

In various fields, it is sometimes necessary to concentrate a feedstock solution.

As traditional concentration methods, for example, evaporation methods and reverse osmosis methods are known.

Since evaporation methods require heating of the feedstock solution, there are concerns about problems such as quality changes due to heating and shape collapse of solid components.

Since reverse osmosis requires pressurization, when used in a high concentration feedstock solution, membrane clogging is likely to occur, and there is a limit in that the concentration efficiency is limited by the capacity of the pressurizing pump.

As a feedstock solution concentration method, the forward osmosis method is also known. The forward osmosis method is a method of transferring a solvent from a feedstock solution flow to a draw solution by adjoining a feedstock solution flow and a draw solution flow via a forward osmosis membrane. Since the forward osmosis method does not require pressurization, it is expected that highly efficient concentration can be continued for long periods of time even when applied to a high-concentration feedstock solution.

However, there is a concern that some of the solute components in the feedstock solution flow may leak into the draw solution flow, whereby the component composition of the obtained concentrated solution may change.

In connection thereto, Patent Literature 1 proposes a technology in which the feedstock solution flow itself after concentration is used as the draw solution flow.

Patent Literature 2 proposes a technology in which membrane-permeable solute components are prevented from leaking from a feedstock solution to a draw solution flow by including the membrane-permeable solute components in the feedstock solution in the draw solution flow at concentrations higher than the concentrations thereof in the feedstock solution.

CITATION LIST

Patent Literature

[PTL 1] Japanese Unexamined Patent Publication (Kokai) No. 2016-150308
[PTL 2] WO 2016/21337

SUMMARY

Technical Problem

Patent Literature 1 describes that, according to the technology described therein, even if a solute component is mixed from the draw solution flow to the feedstock solution flow, it is possible to prevent adverse effects on the component composition of the obtained concentrate solution.

However, according to this method, in addition to requiring a step of preparing a concentrate of the feedstock solution flow as draw solution flow, there is a concern that the presence of feedstock solution flows on both sides of the forward osmosis membrane may cause clogging of the membrane, whereby the desired concentrate magnification cannot be obtained.

In order to carry out the method described in Patent Literature 1, a step of preparing a concentrate of the feedstock solution flow is required. Thus, there is a concern that loss or alteration of components in the feedstock solution may occur. When a concentrate solution in which loss or alteration of the components thereof has occurred is used as the draw solution flow, the component balance of the obtained concentrate may be disturbed, or the altered components may leak and diffuse into the feedstock solution flow, whereby the quality of the product may be impaired.

According to the method of Patent Literature 2, the membrane-permeable solute should be included in the draw solution flow at a high concentration. Thus, it is necessary to prepare a large amount of the membrane-permeable solute. When carrying out the method of Patent Literature 2, the membrane-permeable solute contained at a high concentration in the draw solution flow may leak and diffuse in the feedstock solution flow, and there is a concern that the component balance of the obtained concentrate may be lost.

The present invention has been conceived in light of such circumstances.

The object of the present invention is to provide a concentration system using a forward osmosis membrane with which the feedstock solution flow can be concentrated with high efficiency by a simple method, and in which the diffusion of solute components in the feedstock solution flow into draw solution flow is controlled.

Solution to Problem

In other words, the present invention is as described below.

Aspect 1

A feedstock solution flow concentration system, which has a first step for counterflowing or parallel flowing a feedstock solution flow containing at least a solute and a solvent and a draw solution flow via a forward osmosis membrane and transferring the solvent in the feedstock solution flow to the draw solution flow to obtain a concentrated feedstock solution flow, which is the feedstock solution flow which has been concentrated, and a diluted draw solution flow, which is the draw solution flow which has been diluted, wherein

- the draw solution flow contains a draw substance, a common solute, and a solvent,
- the solvents of the feedstock solution flow and the draw solution flow both contain water,
- the common solute is a solute which is common between the feedstock solution flow and the draw solution flow and is the same solute as at least one solute among the solutes contained in the feedstock solution flow, and
- the concentration of the common solute in the draw solution flow is 1% to less than 100% of the concentration of the common solute in the feedstock solution flow.

Aspect 2

The system according to aspect 1, wherein the number average molecular weight of the common solute is 15,000 or less.

Aspect 3

The system according to aspect 1 or 2, wherein the common solute is one or more selected from an ester, a terpene, a phenylpropanoid, a nucleic acid, a protein, a protein preparation, a vaccine, a sugar, a peptide, an amino acid, a natural product pharmaceutical, a small molecule pharmaceutical, an antibiotic, an antibiotic, a vitamin, an inorganic salt, a protonic polar organic compound, and an aprotic polar organic compound.

Aspect 4

The system according to aspect 3, wherein the common solute comprises:

a cation having at least one element selected from the group consisting of sodium, magnesium, phosphorus, potassium, calcium, chromium, manganese, iron, cobalt, copper, zinc, selenium, and molybdenum, and an anion having at least one element selected from the group consisting of oxygen, sulfur, nitrogen, chlorine, and iodine.

Aspect 5

The system according to any one of aspects 1 to 4, wherein the concentration of the common solute in the draw solution flow is 6% to 96% of the concentration of the common solute in the feedstock solution flow.

Aspect 6

The system according to any one of aspects 1 to 4, wherein the concentration of the common solute in the draw solution flow is 30% to 96% of the concentration of the common solute in the feedstock solution flow.

Aspect 7

The system according to any one of aspects 1 to 6, further comprising a second step in which a solvent is separated from the draw solution flow to obtain a concentrated draw solution flow, which is the draw solution flow which has been concentrated.

Aspect 8

The system according to aspect 7, further comprising means for using, in the first step, a draw solution flow prepared by mixing the diluted draw solution flow obtained in the first step and the concentrated draw solution flow obtained in the second step.

Aspect 9

The system according to aspect 7 or 8, wherein the second flow is carried out using a membrane distillation process using a semipermeable membrane.

Aspect 10

The system according to any one of aspects 1 to 9, wherein the forward osmosis membrane is used in the form of a forward osmosis membrane module constituted by fiber bundle of a plurality of hollow fibers.

Aspect 11

The system according to aspect 10, wherein the forward osmosis membrane is composite hollow fibers each having an active separation layer composed of a thin polymer membrane on an inner surface of a hollow fiber-like porous support membrane.

Aspect 12

The system according to any one of aspects 1 to 11, wherein the feedstock solution flow is a food, pharmaceutical, pharmaceutical ingredient, pharmaceutical raw material, or pharmaceutical intermediate.

Advantageous Effects of Invention

According to the present invention, there is provided a system using a forward osmosis membrane with which the feedstock solution flow can be concentrated with high efficiency by a simple method, and in which the diffusion of solute components in the feedstock solution flow into draw solution flow is controlled. The present invention can be suitably applied to applications such as concentration of foods and pharmaceuticals; treatment of precursor solutions for chemical synthesis; and treatment of produced water discharged from shale gas and oil fields.

DESCRIPTION OF EMBODIMENTS

<<Feedstock Solution Flow Concentration System>>

The feedstock solution flow concentration system of the present invention is:

a feedstock solution flow concentration system, which has a step (first step) for counterflowing or parallel flowing a feedstock solution flow containing at least a solute and a solvent and a draw solution flow via a forward osmosis membrane and transferring the solvent in the feedstock solution flow to the draw solution flow to concentrate the feedstock solution flow, wherein the draw solution flow contains a draw substance, a common solute, and a solvent, the solvents of the feedstock solution flow and the draw solution flow both contain water, the common solute is a solute which is common between the feedstock solution flow and the draw solution flow and is the same solute as at least one solute among the solutes contained in the feedstock solution flow, and the concentration of the common solute in the draw solution flow is 1% to less than 100% of the concentration of the common solute in the feedstock solution flow.

The feedstock solution flow concentration system of the present invention may further have a step (second step) in which the solvent is removed from the draw solution flow to obtain a concentrated draw solution flow, which is the draw solution flow which has been concentrated.

First, a summary of the feedstock solution flow concentration system of the present invention will be described with referring to FIGS. 1 and 2.

Figure 1:
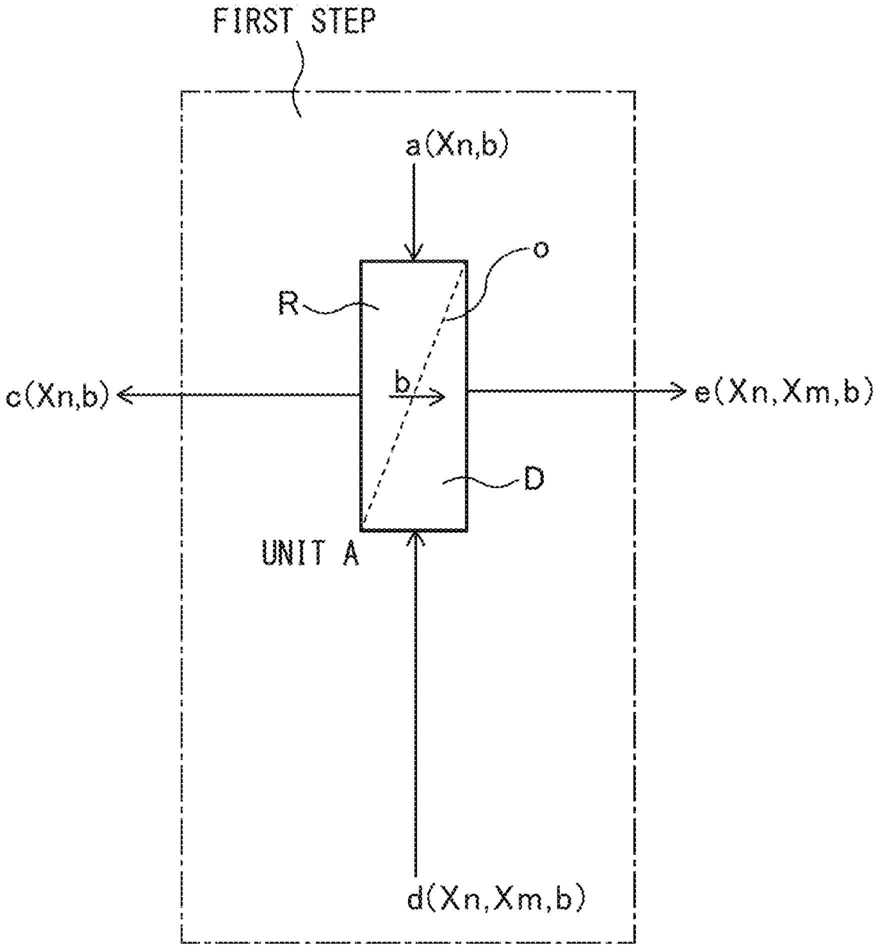
FIG. 1 is a conceptual diagram detailing an example of the system of the present invention.

FIG. 1 is a conceptual diagram detailing the feedstock solution flow concentration system of the present invention having a first step.

In the first step, a feedstock solution flow and a draw solution flow are counterflowed or parallel flowed via a forward osmosis membrane and the solvent in the feedstock solution flow is transferred to the draw solution flow, whereby the feedstock solution flow is concentrated.

In the first step of the feedstock solution flow concentration system of FIG. 1, a forward osmosis membrane o is provided, and a unit A which carries out a forward osmosis process is used. The interior space of the unit A is bifurcated by the forward osmosis membrane o into a feedstock solution flow-side space R and a draw solution flow-side space D. A feedstock solution flow a, which is the concentration target, is introduced into the feedstock solution flow-side space R of the unit A. A draw solution flow d is introduced into the draw solution flow-side space D of the unit A.

The feedstock solution flow a contains a solute Xn and a solvent b. The draw solution flow d contains a draw substance Xm, the solute (common solute) Xn, and the solvent b. The solute Xn in the feedstock solution flow a and the solute Xn in the draw solution flow d are the same type of solute, and are a common solute which is common between both flows. When the feedstock solution flow a contains a plurality of types of solutes, the common solute may be a part of the plurality of types of solutes or may be the entirety thereof.

When the feedstock solution flow a and the draw solution flow d are counterflowed or parallel flowed via the forward osmosis membrane o, using the osmotic pressure difference between the two solutions as a driving force, the solvent b in the feedstock solution flow a passes through the forward osmosis membrane o and is transferred to the draw solution flow d side. As a result, a concentrated feedstock solution flow c, which is the feedstock solution flow which has been concentrated, and a diluted draw solution flow e, which is the draw solution flow which has been diluted, are obtained. Though the feedstock solution flow a and the draw solution flow d are counterflowed in the first step of FIG. 1, they may be parallel flowed.

The concentration of the common solute Xn in the draw solution flow d is set so as to be less than the concentration of the common solute Xn in the feedstock solution flow a. As a result, the osmotic pressure difference which serves as a driving force for transferring the solute Xn in the feedstock solution flow a to the draw solution flow d side is mitigated. It is believed that since the concentration of the common solute Xn of the draw solution flow d is less than that of the feedstock solution flow a, the common solute Xn is not transferred from the draw solution flow d to the feedstock solution flow a. As a result, it is possible to effectively concentrate the feedstock solution flow a without changing the solute components.

Figure 2:
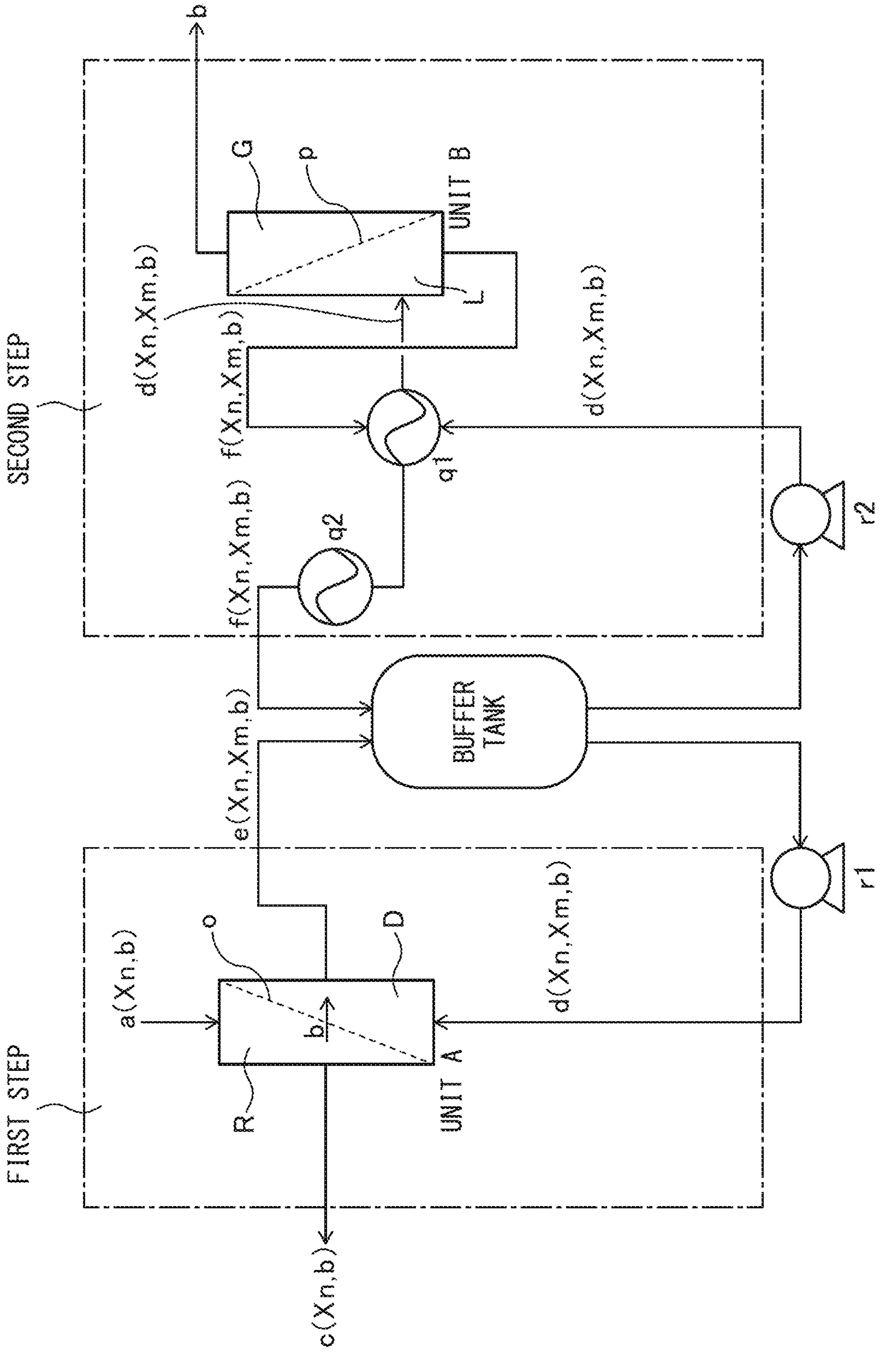
FIG. 2 is a conceptual diagram detailing another example of the system of the present invention.

FIG. 2 is a conceptual diagram detailing the feedstock solution flow concentration system of the present invention having the first step and a second step.

The first step of FIG. 2 is the same as the case of FIG. 1.

In the second step of FIG. 2, the solvent b is removed from the draw solution flow d to obtain a concentrated draw solution flow f, which is the draw solution flow which has been concentrated.

In the second step of the feedstock solution flow concentration system of FIG. 2, a unit B which has a semipermeable membrane p and which carries out a membrane distillation process is used. The interior space of the unit B is bifurcated by the semipermeable membrane p into a liquid phase L and a gas phase G. The draw solution flow d, which is the concentration target, is introduced into the liquid phase L of the unit B. The pressure of the gas phase G of the unit B is set to a vacuum.

The draw solution flow d contains the draw substance Xm, the common solute Xn, and the solvent b.

The solvent b in the draw solution flow d introduced into the unit B is transferred though the semipermeable membrane p into the vacuum-side cavity. As a result, the concentrated draw solution flow f and the solvent b are obtained.

In place of the membrane distillation process, a distillation process or forward osmosis process may be used in the second step.

In the feedstock solution flow concentration system of FIG. 2, the first step and the second step are connected via a buffer tank.

The buffer tank shown in FIG. 2 has a function of mixing the optimum mixing amounts of the diluted draw solution flow e obtained in the first step and the concentrated draw solution flow f obtained in the second step to prepare the draw solution flow d. As a result, in the feedstock solution flow concentration system of FIG. 2, the draw solution flow d can be continuously supplied to the unit A of the first step and the unit B of the second step, and thus, concentration of the feedstock solution flow using a forward osmosis membrane can be continuously carried out for long periods of time.

Reference signs r1 and r2 in FIG. 2 are feed pumps, q1 is a heat exchanger, and q2 is a cooling device.

In the feedstock solution flow concentration system of FIG. 2, the first step and the second step are connected via the buffer tank. However, in the present invention, this buffer tank is not an indispensable requirement. For example, the diluted draw solution flow e obtained in the first step may be directly fed to the unit B of the second step, and the concentrated draw solution flow f obtained in the second step may be used as the draw solution flow d of the first step.

In the second step, the unit B, which carries out a membrane distillation process, is used. However, in the present invention, in the second step, another means which can concentrate the draw solution flow d to obtain the concentrated draw solution flow f may be used. For example, an evaporation means other than a membrane distillation process may be used as the concentration means.

In the second step, the evaporation means other than membrane distillation may be, for example, a distillation process, a vacuum distillation process, or a natural drying process. However, carrying out the second step by a membrane distillation process is preferable from the viewpoint that the size of the feedstock solution flow concentration system of the present invention can be reduced.

When an evaporation means is used in the second step, since the feedstock solution flow concentration system adiabatically compresses the generated vapor of the solvent b into high-temperature compressed vapor, a mechanical vapor recompression (MVR) means may further be provided. The heat of the high-temperature compressed vapor obtained by MVR can be reused for the evaporation means in the second step.

<<Elements of Feedstock Solution Flow Concentration System>>

A summary of the feedstock solution flow concentration method by the feedstock solution flow concentration system of the present invention was described above. Next, the elements constituting the feedstock solution flow concentration system of the present invention will be described in detail below.

<<Feedstock Solution Flow a>>

The feedstock solution flow a is a fluid containing a solute as the target of concentration and the solvent b. The feedstock solution flow a may be an emulsion as long as it is a fluid.

Examples of the feedstock solution flow a used in the present invention include foods, pharmaceutical raw materials, seawater, and produced water discharged from gas and oil fields. However, in the feedstock solution flow concentration system of the present invention, the draw solution flow d contains the solute common with the feedstock solution flow a in a range of 1% to less than 100% of the concentration of the common solute in the feedstock solution flow a. By including the common solute in the draw solution flow d in this concentration range, the transfer of the solute from the feedstock solution flow a to the draw solution flow d can be controlled, and a concentrate in which the composition ratio of the feedstock solution flow a is maintained or substantially maintained is obtained.

According to or in accordance with the technology of Patent Literature 2, if the concentration of the common solute in the draw solution flow d is equal to or greater than the concentration of the common solute in the feedstock solution flow a, the common solute in the draw solution flow d leaks and diffuses into the feedstock solution flow a, whereby disruption of the composition ratio of the components in the obtained concentrate often occurs.

In connection thereto, in the feedstock solution flow concentration system of the present invention, the concentration of the common solute in the draw solution flow d is adjusted to a range lower than the concentration of the common solute in the feedstock solution flow a, specifically, a range of 1% to less than 100%. Thus, leakage and diffusion of the common solute in the draw solution flow d into the feedstock solution flow a can be suppressed, and as a result, the component composition ratio of the feedstock solution flow a can be concentrated as-is or substantially as-is.

Thus, when the feedstock solution flow concentration system of the present invention is used for foods, concentration can be carried out with less loss of aroma components and color components. When the system of the present invention is used for concentration of pharmaceuticals or the raw materials thereof, the component balance before and after concentration is substantially maintained, whereby concentration can be carried out in a state in which pharmaceutical efficacy is maintained.

For the reasons described above, in the feedstock solution flow concentration system of the present invention, it is preferable that a solution containing a low molecular weight solute which can pass through the forward osmosis membrane (semipermeable membrane) depending on the conditions be used as the feedstock solution flow and at least one of the low molecular weight solutes be the solute common between the feedstock solution flow and the draw solution flow.

The low molecular weight solute may be a material having a number average molecular weight of, for example, 15,000 or less. The number average molecular weight of the low molecular weight solute may be, for example, 30 or more, 50 or more, 100 or more, 500 or more, 1,000 or more, 3,000 or more, or 6,000 or more. It may be difficult for the solute having a number average molecular weight of 6,000 or more to pass through the forward osmosis membrane, depending on the conditions, but by appropriately setting the implementation conditions, it can pass through the forward osmosis membrane, and even in such a case, the desired effect of the present application is advantageously exhibited.

The feedstock solution flow a used in the present invention is preferably a food, pharmaceutical, pharmaceutical ingredient, pharmaceutical raw material, or pharmaceutical intermediate.

Examples of foods to be concentrated by the feedstock solution flow concentration system of the present invention include coffee extract, juice (for example, orange juice and tomato juice), alcoholic beverages (for example, wine and beer), dairy products (for example, lactic acid bacteria beverages and raw milk), soup stock (for example, kelp stock and bonito stock), tea extract, aromatic emulsions (for example, emulsions such as vanilla essence and strawberry essence), syrups (for example, maple syrup and honey), and food oil emulsions (for example, emulsions of rapeseed oil, olive oil, sunflower oil, safflower, and corn).

(Solute of Feedstock Solution Flow a)

The food, pharmaceutical, pharmaceutical ingredient, pharmaceutical raw material, or pharmaceutical intermediate to be concentrated by the feedstock solution flow concentration system of the present invention includes, as a solute, a useful substance selected from the group consisting of nucleic acids, proteins, sugars, peptides, amino acids, antibiotics, natural product pharmaceuticals, small molecule pharmaceuticals, and vitamins. The number average molecular weights of these solutes are preferably 100 or more, from the viewpoint of ensuring the medicinal properties thereof, and are preferably 6,000 or less, from the viewpoint of suppression adhesion to the forward osmosis membrane.

Specific examples of the solutes contained in the food, pharmaceutical, pharmaceutical ingredient, pharmaceutical raw material, or pharmaceutical intermediate are described below.

Examples of nucleic acids include oligonucleotides, RNA, siRNA, miRNA, aptamers, decoys, CpG oligos, antisenses, mipomersen, eteplirsen, nusinersen, and pegaptanib.

Examples of proteins include protein preparations and vaccines. Examples of protein preparations include interferon α, interferon β, interleukins 1 to 12, growth hormone, erythropoietin, insulin, granulocyte colony stimulating factor (G-CSF), tissue plasminogen activator (TPA), natriuretic peptides, blood coagulation factor VIII, somatomedin, glucagon, growth hormone-releasing factors, serum albumin, and calcitonin, and examples of vaccines include hepatitis A vaccines, hepatitis B vaccines, and hepatitis C vaccines.

Examples of sugars include monosaccharides (for example, glucose, fructose, galactose, mannose, ribose, and deoxyribose), disaccharides (for example, maltose, sucrose, and lactose), and sugar chains (for example, in addition to glucose, galactose, mannose, fucose, xylose, glucuronic acid, and iduronic acid, sugar derivatives such as N-acetylglucosamine, N-acetylgalactosamine, and N-acetylneuraminic acid).

The term "peptide" means a compound in which two or more arbitrary amino acids are bonded, and the term encompasses dipeptides in which two amino acids are bonded, tripeptides in which three amino acids are bonded, oligopeptides in which 4 to 10 amino acids are bonded, and polypeptides in which 11 or more amino acids are bonded. The peptides may be chained or cyclic.

Examples of amino acids include essential amino acids, non-essential amino acids, and non-natural amino acids. Examples of essential amino acids include tryptophan, lysine, methionine, phenylalanine, threonine, valine, leucine, and isoleucine. Examples of non-essential amino acids include arginine, glycine, alanine, serine, tyrosine, cysteine, asparagine, glutamine, proline, aspartic acid, and glutamic acid.

The phrase "non-natural amino acids" means amino acids which are not present in nature, and examples thereof include "labeled amino acids" in which an arbitrary labeling compound is combined with an amino acid skeleton. The labeling compound may be, for example, a dye, a fluorescent substance, a chemical luminescent substance, a bioluminescent substance, an enzyme substrate, a coenzyme, an antigenic substance, or a protein-binding substance. Specific examples of non-natural amino acids include photoresponsive amino acids, optical switch amino acids, fluorescent probe amino acids, and fluorescent labeled amino acids.

Examples of antibiotics include streptomycin and vancomycin.

Examples of natural product pharmaceuticals include cyclosporine, eribulin, rapamycin, and tacrolimus.

Examples of small molecule pharmaceuticals include ledipasvir, revlimid, fluticasone, sofosbuvir, rosuvastatin, pregabalin, imatinib, tiotropium, sitagliptin, emtricitabine, altovastatin, clopidogrel, amlodipine, esomeprazole, simvastatin, olanzapine, valsartan, venlafaxine, sertraline, ranitidine, omeprazole, enalapril, nifedipine, fluoxetine, pravastatin, famotidine, captopril, and acetaminophen. Substances similar thereto, progenitors, and intermediates thereof may be used. The molecular weights of the small molecular pharmaceuticals are preferably 2,000 or less.

Examples of vitamins include vitamin A, B-group vitamins, and vitamin C, and encompasses derivatives and salts thereof. Examples of B-group vitamins include vitamin B6 and vitamin B12.

(Common Solute)

At least one solute included in the feedstock solution flow a is also contained in the draw solution flow d. This solute, as used herein, is referred to below as the common solute Xn, which is common between the feedstock solution flow a and the draw solution flow d.

Among the solutes contained in the feedstock solution flow a, examples of the common solute include esters, terpenes (terpenoids), phenylpropanoids, nucleic acids, proteins, protein preparations, vaccines, sugars, peptides, amino acids, natural product pharmaceuticals, small molecule pharmaceuticals, antibiotics, antibiotics, vitamins, inorganic salts, protonic polar organic compounds, and aprotic polar organic compounds. By using one or more of these as the common solute, a concentrated food having an excellent flavor in which the composition of the aromatic components is maintained, or a concentrated pharmaceutical in which the composition of the medicinal ingredients is maintained and the medicinal effect is maintained is obtained, which is preferable.

As specific examples thereof:

examples of esters include ethyl butyrate, ethyl isobutyrate, methyl 2-methylbutyrate, and ethyl methylbutanoate;

examples of terpenes include α-pinene, β-pinene, sabinene, myrcene, cymene, ocimene, terpinene, linalool, borneol, thymol, α-ionone, β-ionone, γ-ionone, and β-citronellol; and examples of phenylpropanoids include cinnamic acid, 3,4-dihydroxycinnamic acid (also referred to as caffeic acid), eugenol, anethole, sesamin, lignans, lignin, and cinnamyl acetate.

The inorganic salts may be a salt comprising a cation having at least one element selected from the group consisting of sodium, magnesium, phosphorus, potassium, calcium, chromium, manganese, iron, cobalt, copper, zinc, selenium, and molybdenum, and an anion having at least one element selected from the group consisting of oxygen, sulfur, nitrogen, chlorine, and iodine, and is preferably selected from alkali metal halides, alkali metal carbonates, alkali metal nitrates, alkali metal sulfates, alkali metal sulfites, alkali metal thiosulfates, alkaline earth metal halides, alkaline earth metal carbonates, alkaline earth metal nitrates, alkaline earth metal sulfates, alkaline earth metal sulfites, and alkaline earth metal thiosulfates, as well as various ammonium salts.

Specific examples of inorganic salts include sodium chloride, potassium chloride, magnesium chloride, calcium chloride, sodium sulfate, magnesium sulfate, sodium thiosulfate, sodium sulfite, ammonium chloride, ammonium sulfate, and ammonium carbonate.

Specific examples of the nucleic acids, proteins, protein preparations, vaccines, sugars, peptides, amino acids, natural product pharmaceuticals, small molecule pharmaceuticals, antibiotics, antibiotics, and vitamins preferably used as the common solute include those exemplified above as solutes included in the feedstock solution flow.

Examples of protonic polar organic compounds include n-butanol, isopropanol, nitromethane, ethanol, methanol, and acetic acid; and examples of aprotic polar organic compounds include N-methylpyrrolidone, tetrahydrofuran, acetone, dimethylformamide, acetonitrile, and dimethyl sulfoxide. These protonic polar organic compounds and aprotic polar organic compounds can be used as the common solute of the present invention as long as the feedstock solution flow concentration system of the present invention is not adversely affected thereby, such as causing defects of the forward osmosis membrane.

(Solvent of Feedstock Solution Flow a)

The solvent b of the feedstock solution flow is a fluid containing water and may be water or a mixed solvent of water and a water-soluble organic solvent, and is preferably capable of dissolving or dispersing the above solutes. The solvent b is commonly water.

<Draw Solution Flow d>

The draw solution flow d contains the common solute Xn, which is the same as at least one of the solutes contained in the feedstock solution flow a, the draw substance Xm, and the solvent b, and is a fluid which has a higher osmotic pressure than the feedstock solution flow a and does not significantly denature the forward osmosis membrane o. The common solute Xn is common with a part or all of the solutes Xn contained in the feedstock solution flow a. The concentration of the common solute Xn in the draw solution flow d is set to 1% to less than 100% of the concentration of the common solute Xn in the feedstock solution flow a. When the common solute Xn includes a plurality of types of solutes, the concentration is preferably set, for each type of common solutes Xn, so that the concentration in the draw solution flow d is 1% to less than 100% of the concentration in the feedstock solution flow a.

When the feedstock solution flow a and the draw solution flow d as described above come into contact via the forward osmosis membrane o, which is a semipermeable membrane, the solvent b in the feedstock solution flow a passes through the forward osmosis membrane o and is transferred to the draw solution flow d, and at this time, transfer of the common solute Xn in the feedstock solution flow to the draw solution flow d side is suppressed.

In the present invention, by carrying out the forward osmosis processing such a draw solution flow d, the feedstock solution flow a can be concentrated while maintaining or substantially maintaining the component composition of the solute.

(Common Solute Xn)

As the common solute Xn in the draw solution flow d, one or more may be suitable selected and used from among the solutes contained in the feedstock solution flow in accordance with the type and properties of the feedstock solution flow a, which is the target of concentration, and the application of the concentrate. Regarding this, refer to the foregoing.

The concentration of the common solute Xn in the draw solution flow d is 1% to less than 100% of the concentration of the common solute Xn in the feedstock solution flow a. From the viewpoint that the elution suppression performance of the common solute Xn becomes remarkable, the concentration of the common solute Xn in the draw solution flow d is preferably 1% to 99% or 6% to 96% with respect to the concentration (mass %) of the common solute Xn in the feedstock solution flow a. The ratio is more preferably 30% to 96%, and in this range, elution of the common solute Xn from the feedstock solution flow a to the draw solution flow d is suppressed to a practically negligible level.

If the concentration of the common solute Xn in the draw solution flow d is 1% or more with respect to the concentration of the common solute Xn in the feedstock solution flow a, leakage of the common solute Xn from the draw solution flow d can be suppressed. If the concentration of the common solute X is 6% or more with respect to the concentration of the common solute Xn in the feedstock solution flow a, the effect of suppressing elution of the common solute Xn from the feedstock solution flow a to the draw solution flow d is significantly higher, which is preferable. It is preferable that this ratio be 96% or less, since clogging of the forward osmosis membrane o and leakage of the common solute Xn from the draw solution flow d are unlikely to occur, and the solubility or dispersibility of the draw substance Xm in the draw solution d is improved and a high osmotic pressure can be obtained.

When the draw solution flow d contains a plurality of types of common solutes Xn, it is sufficient that one thereamong satisfy the above concentration conditions. However, it is preferable that all of the common solutes Xn contained in the draw solution flow d be 1% to less than 100% of the concentration (mass %) of the corresponding common solute Xn in the feedstock solution flow a.

Even if the common solute Xn is present as ions ionized in the solvent b, the concentration of the common solute Xn in the present invention is determined based on the value of the formula weight prior to ionization.

(Draw Substance Xm)

The draw substance Xm is a material which is contained in the draw solution flow d, and imparts the draw solution flow d with a higher osmotic pressure than the feedstock solution flow a.

Examples of the draw substance Xm which can be used in the present invention include inorganic salts, sugars, alcohols, and polymers.

Examples of inorganic salts include sodium chloride, potassium chloride, magnesium chloride, calcium chloride, sodium sulfate, magnesium sulfate, sodium thiosulfate, sodium sulfite, ammonium chloride, ammonium sulfate, and ammonium carbonate;

examples of sugars include general sugars such as sucrose, fructose and glucose, and special sugars such as oligosaccharides and rare sugars;

examples of alcohols include monoalcohols such as methanol, ethanol, 1-propanol and 2-propanol, and glycols such as ethylene glycol and propylene glycol; and examples of polymers include polymers such as polyethylene oxide and propylene oxide, as well as copolymers thereof.

The examples of the draw substance Xm above partially overlap the examples of the common solutes Xn. The materials for which the examples overlap can be used as the common solute Xn or can be used as the draw substance Xm. However, a draw solution flow d containing a certain material as the draw substance Xm cannot be used to concentrate a feedstock solution flow a containing the certain material as the common solute Xn. This is because, since the concentration of the common solute Xn in the draw solution flow d is limited to 1% to less than 100% of the concentration of the common solute Xn in the feedstock solution flow a, it is unlikely that the draw solution flow d will be imparted with a higher osmotic pressure than the feedstock solution flow a at such low concentrations.

The concentration of the draw substance Xm in the draw solution flow d is set so that the osmotic pressure of the draw solution flow d is higher than the osmotic pressure of the feedstock solution flow a. As long as the osmotic pressure of the draw solution flow d is higher than the osmotic pressure of the feedstock solution flow a, it may fluctuate within that range.

To determine the osmotic pressure difference between two liquids, one of the following methods can be used.

(1) When the two liquids separate into two phases after mixing: it is determined that a liquid having an increased volume after the separation into two phases has a higher osmotic pressure; or (2) when the two liquids do not separate into two phases after mixing: the two liquids are brought into contact with each other via the forward osmosis membrane o, and it is determined that a liquid having an increased volume after a certain period of time has a higher osmotic pressure. At this time, the certain period of time depends on the osmotic pressure difference, but is generally in the range of several minutes to several hours.

The common solute Xn along with the draw substance Xm contributes to the generation of the osmotic pressure of the draw solution flow d. Thus, for setting of the concentration of the draw substance Xm in the draw solution flow d, for example, the Van't Hoff formula may be used after considering the concentration of the common solute Xn in the draw solution flow d.

As a typical example, when water is used as the solvent b and a water-soluble inorganic salt is used as the draw substance Xm, the concentration of the draw substance Xm in the draw solution flow d can be, for example, in the range of 15% by mass to 60% by mass.

(Solvent of Draw Solution Flow d)

The solvent of the draw solution flow d is a fluid containing water, is preferably capable of dissolving or dispersing the common solute Xn and the draw substance Xm, and is preferably a solvent of the same type as the solvent b to be separated from the feedstock solution flow a. For example, if the solvent of the feedstock solution flow a is water, the solvent of the draw solution flow d is also preferably water.

(Draw Solution Flow d Preparation Method)

The draw solution flow d used in the present invention can be prepared by dissolving or dispersing the common solute Xn and the draw substance Xm in the solvent b.

As described above, in the feedstock solution flow concentration system of the present invention, the concentration of the common solute in the draw solution is 1% to less than 100% of the concentration of the common solute in the feedstock solution flow, and may be 1% to 99%, 6% to 96%, or 30% to 96%.

The common solute Xn may be introduced into the draw solution flow d by the addition of the feedstock solution flow a itself or may be introduced into the draw solution flow d by the addition of components corresponding to the common solute Xn.

When the introduction of the common solute Xn into the draw solution flow d is carried out by the addition of the feedstock solution flow a itself, it is not necessary to prepare a large amount of concentrate or common solute of the feedstock solution flow in advance, whereby the draw solution flow d can be prepared by a simple means.

The addition of the common solute Xn and the draw substance Xm into the solvent b may be carried out at any time during which the system is running. The addition is preferably carried out, for example, before the draw solution flow d is introduced into the unit A of the first step or before it is introduced into the unit B of the second step, but is not limited thereto.

Depending on the type of the feedstock solution flow a and the intended application of concentrated feedstock solution flow c, prevention of the transfer of the common solute Xn from feedstock solution flow a to draw solution flow d at arbitrary times during system operation may be desired. In such a case, the present invention includes an embodiment in which, for example, first, operation is started with a draw solution flow d consisting of the draw substance Xm and solvent b, and a common solute Xn of predetermined concentration is added to the draw solution flow d prior to the time at which the prevention of the transfer of common solute Xn is desired.

<First Step>

In the first step of the feedstock flow concentration system of the present invention, a forward osmosis process is carried out using the unit A, the interior space of which is separated into two including the feedstock solution flow-side space R and the draw solution flow-side space D, by the forward osmosis membrane o.

<Forward Osmosis Membrane o of Forward Osmosis Unit)

The forward osmosis membrane o of the unit a is a membrane which has a function of allowing the solvent b to permeate but preventing or inhibiting permeation of the solute.

Examples of the form of the forward osmosis membrane o include a hollow-fiber form, a flat membrane form, and a spiral membrane form.

The forward osmosis membrane o is preferably a composite membrane having an active separation layer on a support layer (support membrane). The support membrane may be a flat membrane or a hollow fiber membrane.

When a flat membrane is used as the support membrane, the support membrane may have an active separation layer on one side or both sides thereof.

When a hollow fiber membrane is used as a support membrane, it may have an active separation layer on the outer surface or the inner surface of the hollow fiber membrane, or on both surfaces.

The support membrane of the present embodiment is a membrane on which the active separation layer is supported, and it is preferable that the support membrane itself not substantially exhibit separation performance with respect to the object to be separated. As the support membrane, any known microporous support membrane or non-woven fabric can be used.

The preferred support membrane of the present embodiment is a microporous hollow fiber support membrane. The microporous hollow fiber support membrane has fine pores having a pore diameter of preferably 0.001 μm to 0.1 μm, and more preferably 0.005 μm to 0.05 μm on the inner surface thereof. Regarding the structure from the inner surface of the microporous hollow fiber support membrane to the outer surface in the depth direction of the membrane, in order to reduce the permeation resistance of the permeating fluid, it is preferable that the structure be as sparse as possible while maintaining strength. The sparse structure of this portion is preferably, for example, a net-like structure, finger-like voids, or a mixed structure thereof.

The material of the support membrane, particularly the microporous support membrane, may be a material which can be molded as a microporous support membrane and is not chemically damaged by the monomer or solvent used to form the active separation layer, but is not particularly limited. In the present embodiment, those capable of forming into a hollow fiber-like microporous support membrane are preferable.

As the material of the support membrane, for example, a material composed of at least one selected from polyether sulfone, polysulfone, polyketone, polyetheretherketone, polyphenylene ether, polyvinylidene fluoride, polyacrylonitrile, polyimine, polyimide, polybenzoxazole, polybenzimidazole, and polyamide as a main component is preferable. A main component of at least one selected from polysulfone and polyether sulfone is more preferable, and using polyethersulfone is particularly preferable.

As an active separation layer in the flat or hollow fiber-like forward osmosis membrane o, for example, a layer composed of a thin polymer membrane containing at least one selected from polysulfone, polyether sulfone, polyvinylidene fluoride, polyacrylonitrile, polyethylene, polypropylene, polyamide, and cellulose acetate as a main component is preferable since the suppression rate of draw substance is high. A main component of at least one selected from polysulfone, polyether sulfone, polyvinylidene fluoride, polyacrylonitrile, and polyamide is more preferable, and a polyamide layer is particularly preferable.

The polyamide in the active separation layer can be formed by interfacial polymerization of a polyfunctional acid halide and a polyfunctional aromatic amine.

The polyfunctional aromatic acid halide is an aromatic acid halide compound having two or more acid halide groups in one molecule. Specific examples thereof include trimesic acid halide, trimellitic acid halide, isophthalic acid halide, terephthalic acid halide, pyromellitic acid halide, benzophenone tetracarboxylic acid halide, biphenyldicarboxylic acid halide, naphthalenedicarboxylic acid halide, pyridinedicarboxylic acid halide, and benzenedisulfonic acid halide and these can be used alone or as a mixture thereof. Examples of the halide ion in these aromatic acid halide compounds include chloride ions, bromide ions, and iodide ions. In the present invention, in particular, trimesic acid chloride alone, a mixture of trimesic acid chloride and isophthalic acid chloride, or a mixture of trimesic acid chloride and terephthalic acid chloride is preferably used.

Polyfunctional aromatic amines are aromatic amino compounds having two or more amino groups in one molecule. Specific examples thereof include m-phenylenediamine, p-phenylenediamine, 3,3'-diaminodiphenylmethane, 4,4'-diaminodiphenylamine, 4,4'-diaminodiphenyl ether, 3,4'-diaminodiphenyl ether, 3,3'-diaminodiphenylamine, 3,5-diaminobenzoic acid, 4,4'-diaminodiphenyl sulfone, 3,3'-diaminodiphenyl sulfone, 3,4'-diaminodiphenyl sulfone, 1,3,5-triaminobenzene, and 1,5-diaminonaphthalene, and these may be used along or as a mixture thereof. In the present invention, in particular, one or more selected from m-phenylenediamine and p-phenylenediamine can suitably be used.

Interfacial polymerization of the polyfunctional acid halide and the polyfunctional aromatic amine can be carried out according to a known method.

Nanoparticles, vesicles, and coating agents may be contained on the surface or interior or both of the support membrane and the molecular active layer constituting the forward osmosis membrane of the present embodiment.

Examples of nanoparticles include open-ended carbon nanotubes, closed-ended carbon nanotubes, carbon fibers, nanofibers, nanowires, nanorods, nanotubes, and metal nanoparticles;

examples of vesicles include liposomes, polymersomes, and self-assembled nanostructures (e.g., self-assemblies including certain transmembrane proteins and detergents); and examples of coating agents include graphene oxide, polyvinyl alcohol, silver-supported polymers, polydopamine, polyvinylpyrrolidone, poly(2-hydroxyethyl methacrylate), cyclodextrin, and silsesquioxane.

In the present embodiment, a hollow fiber-like forward osmosis membrane is preferably used, and in particular, a composite hollow fiber having an active separation layer composed of a thin polymer membrane on an inner surface of a hollow fiber-like porous support membrane is preferably used.

As the unit A, a unit in the form of a forward osmosis membrane module in which a fiber bundle of a plurality of forward osmosis membranes is preferably housed in a suitable housing is preferably used.

The permeability flux for the solvent b of the forward osmosis membrane o is preferably 1 to 100 kg/($m^2$xhr). If the permeability flux is less than 1 kg/($m^2$xhr), the solvent b separation efficiency may be impaired, and if it exceeds 100 kg/($m^2$xhr), the transfer amount of the draw substance Xm from the draw solution flow d to the concentrated feedstock solution flow c via the forward osmosis membrane o may increase.

The permeability flux for the solvent b as used herein means an amount obtained by assigning the amount of the solvent b passing through the forward osmosis membrane o per unit area of the forward osmosis membrane o and per unit time, and is defined by the following formula (1):

$$F=L/(M\times H) \quad (1)$$

where F is the permeability flux (kg/($m^2$xhr)) for solvent b, L is the amount of solvent b permeated (kg), M is the surface area ($m^2$) of the forward osmosis membrane o, and H is the time (hr).

The permeability flux when the solvent b is water is generally referred to as "water permeability", and can be measured using, for example, pure water as a treatment liquid and 3.5% by mass saline as the draw solution flow.

(Introduction of Feedstock Solution Flow a and Draw Solution Flow d into Unit A)

The feedstock solution flow a, which is the object to be concentrated, is introduced into the feedstock solution flow-side space R of the unit A, and the draw solution flow d is introduced into the draw solution flow-side space D. The directions of these flows may be counterflow or parallel flow.

Though the flow rate of the feedstock solution flow a introduced into the feedstock solution flow-side space R of the unit A is arbitrary, a typical example includes the range of 50 mL/($m^2$·min) to 1500 mL/($m^2$·min) per $m^2$ surface area of the forward osmosis membrane in the unit A per minute, and is preferably set to 100 mL/($m^2$·min) to 1000 mL/($m^2$·min).

Though the flow rate of the draw solution flow d introduced into the draw solution flow-side space D of unit A is arbitrary, an example thereof includes the range of 100 mL/($m^2$·min) to 5000 mL/($m^2$·min), and is preferably set to 500 mL/($m^2$·min) to 2000 mL/($m^2$·min)

(Temperatures of Feedstock Solution Flow a and Draw Solution Flow d)

In the first step, the temperature of the feedstock solution flow a introduced into the feedstock solution flow-side space R of the unit A is not particularly limited. It is not necessary to specifically control the temperature. The temperature may be, for example, room temperature.

The temperature of the draw solution flow d introduced into the draw solution flow-side space D of the unit A is not particularly limited, but is preferably 5° C. to 60° C., and more preferably 15° C. to 40° C. Though the reason is not clear, when the temperature of the draw solution flow d is less than 15° C. or higher than 60° C., in some cases, the amount of the draw substance Xm transferred from the draw solution flow d to the feedstock solution flow a via the forward osmosis membrane o is increased.

(Second Step)

The second step optionally used in the solvent separation system of the present embodiment is:

a step of separating the solvent b from the draw solution flow d to obtain a concentrated draw solution flow f, which is the draw solution flow which has been concentrated, and the solvent b.

In the step of separating the draw solution flow d into the concentrated draw solution flow f and the solvent b, for example, a distillation process, a forward osmosis process, or a membrane distillation process can be used.

The distillation process is a step of adjusting the draw solution flow d to a predetermined temperature, and then passing it through a distillation column to obtain the solvent b from the top of the column as well as obtaining a concentrated draw solution flow f, which is the draw solution flow from which the solvent b has removed and which has been concentrated, from the bottom of the column.

The forward osmosis process is a step in which the draw solution flow d is flowed through the forward osmosis membrane so that the solvent b contained in the draw solution flow d passes through the forward osmosis membrane and thereby separated into the solvent b and the concentrated draw solution flow f, from which the solvent b is removed.

The membrane distillation process may be carried out, for example, by the configuration shown as the second step in FIG. 2. In this case, the membrane distillation process is configured such that the separation chamber is divided into the liquid phase L and the gas phase G using the semipermeable membrane p, and the solvent b contained in the draw solution flow d passes from the liquid phase L through the semipermeable membrane to the gas phase G at reduced pressure, whereby the draw solution flow d can be separated into the solvent b and the concentrated draw solution flow f.

As a process in the second step, a forward osmosis process using a forward osmosis membrane or a membrane distillation process using a semipermeable membrane p is preferable in terms of small facility size, and a membrane distillation process using a semipermeable membrane p is more preferable in terms of suppressing the transfer of the draw substance Xm from the draw solution flow d to the solvent b.

(Semi-Permeable Membrane p of Membrane Distillation Process)

Examples of the shape of the semipermeable membrane p used in the membrane distillation process include any shape selected from the shapes exemplified above regarding the shape of the forward osmosis membrane o in the first step, and specific examples thereof include a hollow fiber shape, a flat membrane shape, and a spiral membrane shape.

The semipermeable membrane p in the form of a flat membrane may be composed of, for example, a single layer, or may have a support layer and an active separation layer on the support layer. The hollow fiber-like semipermeable membrane p may be, for example, a hollow fiber composed of a single layer, or may have a hollow fiber-like support layer and an active separation layer on an outer surface or an inner surface, or both, of the support layer.

The material of the support layer and the active separation layer in the semipermeable membrane p may be any material selected from the materials exemplified above for the forward osmosis membrane o in the first step.

The permeability flux for the solvent b of the semipermeable membrane p is preferably 1 kg/($m^2$·hr) to 200 kg/($m^2$×hr). If the permeability flux is less than 1 kg/($m^2$×hr), efficient separation of the solvent b may be impaired, and if it exceeds 200 kg/($m^2$×hr), the transfer amount of the draw substance from the draw solution flow d to the solvent b via the semipermeable membrane p may be increased.

This permeability flux is defined in the same manner as the permeability flux for solvent b of the forward osmosis membrane o in the first step.

(Temperature of Draw Solution Flow d introduced in Membrane Distillation Process)

It is preferable that the temperature of the draw solution flow d be adjusted to a range of 20° C. to 90° C. prior to introduction into the liquid phase L. If this temperature is less than 20° C., the efficiency of separation of the solvent b by membrane distillation may be impaired, and if it exceeds 90° C., the amount of the draw substance Xm contained in the draw solution flow d transferred to solvent b via the semipermeable membrane p may increase.

As the heat source for heating the draw solution flow d, for example, a heat exchanger q1 can be used, or waste heat such as from an industrial process can be used. When waste heat is utilized as the heat source, the amount of energy newly consumed for separation of the solvent b can be reduced, which is preferable.

(Gas Phase G in Membrane Distillation Process)

It is preferable that the pressure of the gas phase G of the unit B used in the membrane distillation process be reduced to a predetermined pressure. The pressure of the gas phase G may be appropriately set according to the scale of the device, the concentration of the draw solution flow d, and the generation rate of the desired solvent b, but is preferably set to, for example, 0.1 kPa to 80 kPa, and more preferably 1 kPa to 50 kPa.

Examples the vacuum device for reducing the pressure of the gas phase G of the unit B include a diaphragm vacuum pump, a dry pump, an oil rotary vacuum pump, an ejector, or an aspirator.

(Products of Second Step)

As a result of the second step, the solvent b is separated from the draw solution flow d to produce the concentrated draw solution flow f, which is the draw solution flow which has been concentrated, and is discharged from the unit B.

The concentrated draw solution flow f can be mixed with the diluted draw solution flow e to adjust to a predetermined concentration and then reused as the draw solution flow d. Upon reuse of the concentrated draw solution flow f, the temperature of the concentrated draw solution flow f may be adjusted using a cooling device q2. Examples of the cooling device q2 include a chiller and a heat exchanger.

The solvent b separated from the draw solution flow d by the second step may be reused if necessary.

<<Preparation and Use of Draw Solution Flow d>>

The feedstock solution flow concentration system of the present invention may further include means for using, in the first step and the second step, the draw solution flow d prepared by mixing the diluted draw solution flow e obtained in the first step and the concentrated draw solution flow f obtained in the second step.

In the system of FIG. 2, the first step and the second step are connected via a buffer tank. The buffer tank has a function of mixing the diluted draw solution flow e obtained in the first step and the concentrated draw solution flow f obtained in the second step at an optimum mixing amount to prepare the draw solution flow d.

The draw solution flow d prepared (regenerated) in the buffer tank can be fed to the first step by a feed pump r1 and to the second step by a feed pump r2 and used in the respective steps.

As a result of such a configuration, the feedstock solution flow concentration system of the present invention can continuously supply the draw solution flow d to the unit A of the first step and the unit B of the second step, and thus, concentration of the feedstock solution flow using the forward osmosis membrane can be continuously carried out for long periods of time.

EXAMPLES

Hereinafter, the present invention will be specifically described based on the Examples, but the present invention is not limited by the Examples.

The following Examples and Comparative Examples were carried out using the feedstock solution flow concentration system having the configuration shown in FIG. 2.

(Preparation of Feedstock Solution Flow Concentration System)

<Preparation of Unit A having Forward Osmosis Membrane o>

(Production of Hollow Fiber Support Membrane Module)

A polyether sulfone (product name: "Ultrason", manufactured by BASF Co., Ltd.) was dissolved in a N-methyl-2-pyrrolidone (manufactured by Wako Pure Chemical Industries, Ltd.) to prepare a 20% by mass hollow fiber spinning stock solution.

A wet hollow spinning machine equipped with a double spinning port was filled with the above stock solution, and extruded into a coagulation tank filled with water to form hollow fibers by phase separation. The obtained hollow fibers were wound on a winding machine. The obtained hollow fibers had an outer diameter of 1.0 mm and an inner diameter of 0.7 mm, and the diameter of micropores on the inner surface thereof was 0.05 μm.

These hollow fibers were used as the microporous hollow fiber support membrane.

A hollow fiber support membrane module having an effective inner membrane surface area of 0.023 $m^2$ was prepared by filling 130 of the above hollow fiber support membranes into a cylindrical plastic housing having a diameter of 2 cm and a length of 10 cm and fixing both ends with an adhesive.

(Production of Unit A, Forward Osmosis Membrane Module)

10 g of m-phenylenediamine and 0.08 g of sodium lauryl sulfate were charged into a 0.5 L capacity vessel, and further 489.2 g of pure water was added for dissolution to prepare 0.5 kg of a first solution used for interfacial polymerization.

0.8 g of trimesic acid chloride was charged into a separate 1.0 L vessel, and 399.2 g of n-hexane was added for dissolution to prepare 0.4 kg of a second solution used for interfacial polymerization.

The core side (inside of the hollow fiber) of the hollow fiber support membrane module manufactured in the "Production of Hollow Fiber Support Membrane Module" above was filled with the first solution, and after standing for 5 minutes, the liquid was withdrawn, whereby the insides of the hollow fibers were wetted with the first solution.

Thereafter, the core side pressure was set to normal pressure by a core side pressure adjusting device, and the shell side pressure was set to a reduced pressure of 90 kPa as an absolute pressure by a shell side pressure adjusting device, and left standing for 5 minutes in this state. Subsequently, on the core side, an operation of passing nitrogen at a flow rate of 5 L/min for 5 minutes was carried out to remove the excess first solution. While the pressure on the shell side was maintained at a reduced pressure of 90 kPa as an absolute pressure, the second solution was fed into the core side by a second solution feeding pump at a flow rate of 50 mL/min for 2 minutes, and interfacial polymerization was carried out. The polymerization temperature was set at 25° C.

Nitrogen was then flowed at 40° C. through the core side of the hollow fiber support membrane module for 1 min to transpirate and remove n-hexane. Both the shell side and the core side were washed with pure water to produce unit A, which is a module of a hollow fiber-like forward osmosis membrane o having an active separation layer composed of a polyamide on the inner surface of the hollow fiber support membrane.

(Preparation of Unit B having Semi-Permeable Membrane p for Membrane Distillation Process)

23 parts by mass of hydrophobic silica (product name "AEROSIL-R972", manufactured by Nippon Aerosil Co., Ltd.) having an average primary particle diameter of 0.016 μm and a specific surface area of 110 $m^2/g$, 31 parts by mass of dioctyl phthalate (DOP), and 6 parts by mass of dibutyl phthalate (DBP) were mixed with a Henschel mixer, and thereafter 40 parts by mass of polyvinylidene fluoride (product name "Solef 6010", manufactured by SOLVAY Co., Ltd.) having a weight-average molecular weight of 310,000 was added thereto, and the mixture was mixed again with the Henschel mixer to obtain a mixture. The mixture was pelletized with a two-axis kneading extruder.

The obtained pellets were melt-kneaded with the two-axis kneading extruder at 240° C., and extruded into a hollow fiber-like shape to obtain hollow fibers. At this time, a spinning port for hollow fiber molding was mounted on the extrusion port in the head of an extruder end, and kneading melt was extruded from an annular hole for melt extrusion, and simultaneously, nitrogen gas was ejected from a circular hole for discharging a hollow portion forming fluid inside the annular hole for melt extrusion, thereby extruding into a hollow fiber shape.

The hollow filament was introduced into a water bath (40° C.) at an empty running distance of 20 cm and wound at a rate of 20 m/min.

The resulting hollow filaments were drawn continuously at a rate of 20 m/min in a pair of first endless orbital belt drawers and passed through a first heated bath (0.8 m length) controlled to a space temperature of 40° C., and then withdrawn at a rate of 40 m/min in a second endless orbital belt withdrawer and stretched 2.0 times in the length direction. After passing through a second heating tank (0.8 m length) controlled to a space temperature of 80° C., the filaments were cooled while being periodically folded at the water surface of a 20° C. cooling water tank. The drawn yarn was then withdrawn at a rate of 30 m/min by a third endless orbital type belt drawer, and the drawn yarn was shrunk (relaxed) to 1.5 times in the length direction, and then wound with a skein (hank) having a circumferential length of approximately 3 m. Periodic folding at the water surface of the cooling water tank was carried out by continuously sandwiching the hollow filaments at a rotation speed of 170 rpm using a pair of convex/concave rollers having four protrusions and lengths of approximately 0.20 m.

The hollow filaments after the above treatment were immersed in methylene chloride to extract and remove DOP and DBP, and then dried. The hollow filaments were then immersed in 50% by mass aqueous ethyl alcohol solution, and then immersed in a 5% by mass aqueous sodium hydroxide solution for 1 hour at 40° C., thereby extracting and removing silica. Thereafter, the filaments were washed with water and dried to obtain a hollow fiber membrane. The obtained hollow fibers had an outer diameter of 1.25 mm and an inner diameter of 0.68 mm, and the diameter of micropores on the inner surface thereof was 0.1 μm. These hollow fibers were used as the semipermeable membrane.

By filling 70 semipermeable membranes composed of the above hollow fibers into a cylindrical plastic housing having a diameter of 2 cm and a length of 10 cm and fixing both ends with an adhesive, unit B, which is a membrane distillation module having a hollow fiber-like semipermeable membrane p having an effective inner membrane surface area of 0.012 $m^2$ was produced.

Comparative Example 1

In Comparative Example 1, the forward osmosis unit A prepared above was used as unit A in the first step, and the membrane distillation unit B produced above was used as unit B in the second step.

Water was used as solvent b.

As the draw solution flow d, an aqueous solution containing magnesium chloride as the draw substance Xm was used, and the magnesium chloride concentration in the draw solution flow d was set to 20% by mass.

As the feedstock solution flow a, an aqueous solution containing sodium chloride was used, and the initial concentration thereof was set to 5.0% by mass.

In the first step, the feedstock solution flow a was flowed into unit A at a flow rate of 10 mL/min and the draw solution flow d was flowed at a flow rate of 24 mL/min.

In the second step, the draw solution flow d was flowed into unit B at a flow rate of 600 mL/min, and the pressure of the gas phase G of unit B was adjusted with a vacuum pump to 10 kPa as an absolute pressure.

The diluted draw solution flow e obtained in the first step and the concentrated draw solution flow f obtained in the second step were mixed in a buffer tank to prepare a draw solution and reused in the first and second steps.

The temperature of the draw solution flow d in the unit A in the first step was 25° C., the temperature of the draw solution flow d in the unit B in the second step was 65° C., and by carrying out operation for 10 hours, concentration of the feedstock solution flow a was carried out.

Comparative Examples 2 to 10

Concentration of the feedstock solution flow a was carried out according to the same procedure as in Comparative Example 1, except that the type and concentration of the draw substance Xm in the draw solution flow d and the solute Xn in the feedstock solution flow a were changed as described in Table 1.

Example 1

Concentration of the feedstock solution flow a was carried out according to the same procedure as in Comparative Example 1, except that a mixture obtained by adding sodium chloride at a concentration of 4.8% by mass as common solute Xn with the feedstock solution flow a together with magnesium chloride as the draw substance Xm was used as the draw solution flow d.

Examples 2 to 15

Concentration of the feedstock solution flow a was carried out according to the same procedure as in Example 1, except that the type of the draw substance Xm in the draw solution flow d, and the type and the concentration of the common solute Xn in the feedstock solution flow a and the draw solution flow d were changed as described in Table 2.

Evaluation (1) Evaluation of Elution Suppression Performance of Solute Xn in Feedstock Solution Flow a The amount of cations (cations derived from solute Xn) ionized from the solute Xn present in the feedstock solution flow a discharged from the unit A was continuously measured using a ICP-MS (Inductively Coupled High Frequency Plasma-Mass Spectrometry) device manufactured by Thermo Fishier Scientific, Ltd., product name "iCAP Q".

The permeate flow rate of the solute Xn in the unit A from the start of the operation to the end of the operation was calculated by the following formula (2). Note that the permeate flow rate of the solute Xn was set as an amount per unit time of the solute Xn-derived cation that has migrated from the feedstock solution flow a into the draw solution flow d via the forward osmosis membrane o.

$$F'=L'/(M'\times H') \quad (2)$$

where F' is the permeation flow rate [g/(m$^2$×hr)] of the solute Xn-derived cation, L' is the total amount (g) of the permeated solute Xn-derived cation, M' is the surface area (m$^2$) of the forward osmosis membrane o, and H' is the operation time (hr).

From the values of the permeate flow rate F' of the obtained solute Xn, the solute elution suppression performances evaluated on the basis of the following criteria are shown in Table 1.

A: the permeate flow rate of solute Xn was below the detectable limit (0 [g/(m$^2$×hr)]) (extremely good)

B: the permeate flow rate of solute Xn exceeded 0 [g/(m$^2$×hr)] and is 3.8 [g/(m$^2$×hr)] or less (suitable)

C: the permeate flow rate of solute Xn exceeded 3.8 [g/(m$^2$×hr)] (poor)

(2) Evaluation of Solute Leakage Suppression Performance by Common Solute into Draw Solution Flow d Comparative Example 1 is an Example in which the common solute Xn was not contained in the draw solution flow d of Examples 1 to 5, Comparative Example 2 is an Example in which the common solute Xn was not contained in the draw solution flow d of Example 6, Comparative Example 3 is an Example in which the draw solution flow d did not contain the common solute Xn of Examples 7 and 8, and Comparative Examples 4 to 10 are Examples in which no common solute Xn was contained in the draw solution flow d of Examples 9 to 15, respectively.

Regarding the corresponding combinations of the Examples and Comparative Examples, the case in which the common solute Xn was contained in the draw solution flow d and the case in which it was not contained were compared by the following indicators.

Using the value of the permeate flow rate F' of the solute Xn calculated by the above formula (2), the value of F' in the Examples was set as "F'1", and the value of F' in the Comparative Examples corresponding to the Examples was set as "F'0", and the solute leakage suppression performance value Z1 due to the common solute inclusion was calculated by the following formula (3) and evaluated on the basis of the following criteria.

$$Z1=\{F'1/F'0\}\times 100(\%) \quad (3)$$

(Evaluation Criteria)

AA: the value of Z1 was 60% or less (extremely good)

A: the value of Z1 was greater than 60% and less than 80% (suitable)

B: the value of Z1 was greater than 80% and less than 95% (acceptable)

C: the value of Z1 exceeded 95%.

The evaluation results of the Comparative Examples are shown in Table 1, and the evaluation results of the Examples are shown in Table 2.

TABLE 1

| | | | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 | Comp Ex 10 |
|---|---|---|---|---|---|---|---|---|---|---|---|---|
| Draw Solution Flow d | Draw Substance Xm | Type<br>Concentration (mass %) | $MgCl_2$<br>20 | KCl<br>20 | $MgCl_2$<br>20 | $MgCl_2$<br>20 | $MgCl_2$<br>20 | $MgCl_2$<br>20 | $MgCl_2$<br>20 | $MgCl_2$<br>20 | $MgCl_2$<br>20 | $MgCl_2$<br>20 |
| Feedstock Solution | Solute Xn | Type | NaCl | NaCl | NaCl, KCl | KCl | $CaCl_2$ | KBr | $NH_4Cl$ | $KHCO_3$ | $K_2SO_4$ | $NaNO_3$ |

TABLE 1-continued

| | | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 | Comp Ex 10 |
|---|---|---|---|---|---|---|---|---|---|---|---|
| Flow a | Initial Concentration (mass %) | 5.0 | 5.0 | 5.0, 5.0 | 5.0 | 5.0 | 5.0 | 5.0 | 5.0 | 5.0 | 5.0 |
| Unit A | Elution Suppression Performance of Solute Xn | C | C | C, C | C | C | C | C | C | C | C |

TABLE 2

| | | | Ex 1 | Ex 2 | Ex 3 | Ex 4 |
|---|---|---|---|---|---|---|
| Draw Solution Flow d | Draw Substance Xm | Type | $MgCl_2$ | $MgCl_2$ | $MgCl_2$ | $MgCl_2$ |
| | | Concentration (mass %) | 20 | 20 | 20 | 20 |
| | Common Solute Xn | Type | NaCl | NaCl | NaCl | NaCl |
| | | Concentration (mass %) | 4.8 | 2.3 | 1.2 | 0.3 |
| Feedstock Solution Flow a | Common Solute Xn | Type | NaCl | NaCl | NaCl | NaCl |
| | | Initial Concentration (mass %) | 5.0 | 5.0 | 5.0 | 5.0 |
| Unit A | Elution Suppression Performance of Common Solute Xn | | A | A | B | B |
| Common Solute Elution Suppression Performance | Corresponding Comp Ex No. | | Comp Ex 1 | Comp Ex 1 | Comp Ex 1 | Comp Ex 1 |
| | Eval Results | | AA | AA | AA | AA |

| | | | Ex 5 | Ex 6 | Ex 7 | Ex 8 |
|---|---|---|---|---|---|---|
| Draw Solution Flow d | Draw Substance Xm | Type | $MgCl_2$ | KCl | $MgCl_2$ | $MgCl_2$ |
| | | Concentration (mass %) | 20 | 20 | 20 | 20 |
| | Common Solute Xn | Type | NaCl | NaCl | NaCl, KCl | NaCl, KCl |
| | | Concentration (mass %) | 0.05 | 2.3 | 2.3, 0.0 | 2.3, 2.9 |
| Feedstock Solution Flow a | Common Solute Xn | Type | NaCl | NaCl | NaCl, KCl | NaCl, KCl |
| | | Initial Concentration (mass %) | 5.0 | 5.0 | 5.0, 5.0 | 5.0, 5.0 |
| Unit A | Elution Suppression Performance of Common Solute Xn | | B | A | A, C | A, A |
| Common Solute Elution Suppression Performance | Corresponding Comp Ex No. | | Comp Ex 1 | Comp Ex 2 | Comp Ex 3 | Comp Ex 3 |
| | Eval Results | | B | AA | AA, C | AA, AA |

| | | | Ex 9 | Ex 10 | Ex 11 | Ex 12 |
|---|---|---|---|---|---|---|
| Draw Solution Flow d | Draw Substance Xm | Type | $MgCl_2$ | $MgCl_2$ | $MgCl_2$ | $MgCl_2$ |
| | | Concentration (mass %) | 20 | 20 | 20 | 20 |
| | Common Solute Xn | Type | KCl | $CaCl_2$ | KBr | $NH_4Cl$ |
| | | Concentration (mass %) | 2.9 | 2.4 | 2.8 | 3.0 |
| Feedstock Solution Flow a | Common Solute Xn | Type | KCl | $CaCl_2$ | KBr | $NH_4Cl$ |
| | | Initial Concentration (mass %) | 5.0 | 5.0 | 5.0 | 5.0 |
| Unit A | Elution Suppression Performance of Common Solute Xn | | A | A | A | A |
| Common Solute Elution Suppression Performance | Corresponding Comp Ex No. | | Comp Ex 4 | Comp Ex 5 | Comp Ex 6 | Comp Ex 7 |
| | Eval Results | | AA | AA | AA | AA |

| | | | Ex 13 | Ex 14 | Ex 15 |
|---|---|---|---|---|---|
| Draw Solution Flow d | Draw Substance Xm | Type | $MgCl_2$ | $MgCl_2$ | $MgCl_2$ |
| | | Concentration (mass %) | 20 | 20 | 20 |
| | Common Solute Xn | Type | $KHCO_3$ | $K_2SO_4$ | $NaNO_3$ |
| | | Concentration (mass %) | 1.5 | 2.4 | 4.2 |

TABLE 2-continued

| | | | | | |
|---|---|---|---|---|---|
| Feedstock Solution Flow a | Common Solute Xn | Type | $KHCO_3$ | $K_2SO_4$ | $NaNO_3$ |
| | | Initial Concentration (mass %) | 5.0 | 5.0 | 5.0 |
| Unit A | Elution Suppression Performance of Common Solute Xn | | A | A | A |
| Common Solute Elution Suppression Performance | Corresponding Comp Ex No. | | Comp Ex 8 | Comp Ex 9 | Comp Ex 10 |
| | Eval Results | | AA | AA | AA |

Comparative Example 11

Comparative Example 11 was carried out using the feedstock solution flow concentration system shown in FIG. 1. The forward osmosis unit A prepared above was used as the unit A in the first step.

Water was used as the solvent b.

As the draw solution flow d, an aqueous solution containing magnesium chloride as the draw substance Xm was used, and the magnesium chloride concentration in the initial draw solution flow d was set to 25% by mass.

As the feedstock solution flow a, an aqueous solution containing ethanol as the solute Xn was used, and the initial concentration thereof was set to 5.0% by mass.

In the feedstock solution flow concentration system shown in FIG. 1, the feedstock solution flow a was flowed at a flow rate of 120 mL/min and the draw solution flow d was flowed at a flow rate of 236 mL/min into unit A in the first step.

The diluted draw solution flow e was circulated with a circulation pump and supplied again as the draw solution flow d.

The temperatures of the feedstock solution flow a in the unit A in the first step and the draw solution flow d were 25° C., and by carrying out operations for 5 hours, concentration of the feedstock solution flow a was carried out.

Comparative Examples 12 to 20

Concentration of the feedstock solution flow a was carried out according to the same procedure as in Comparative Example 11, except that the types and concentrations of the draw substance Xm in the draw solution flow d and the solute Xn in the feedstock solution flow a were changed as described in Table 3.

Example 16

Concentration of the feedstock solution flow a was carried out according to the same procedure as in Comparative Example 11, except that ethanol was added at a concentration of 1.0% by mass as the common solute Xn in the feedstock solution flow a together with magnesium chloride as the draw substance Xm in the draw solution flow d.

Examples 17 to 27 and Comparative Examples 21 to 23

Concentration of the feedstock solution flow a was carried out according to the same procedure as in Example 16, except that the type of the draw substance Xm in the draw solution flow d, and the type and the concentration of the common solute Xn in the feedstock solution flow a and the draw solution flow d were changed as described in Table 4.

Note that, even when the common solute Xn is difficult to dissolve in the draw solution flow d, the solution was well stirred, and the concentration of the feedstock solution flow a was evaluated by carrying out the concentration of the feedstock solution flow a while keeping the concentration as uniform as possible.

Evaluation

Regarding the concentration of the feedstock solution flow a carried out in Comparative Examples 11 to 23 and Examples 16 to 27 described above, (1) evaluation of the elution suppressing performance of the solute Xn in the feedstock solution flow a, and (2) evaluation of the solute leakage suppressing performance due to the common solute content in the draw solution flow d were carried out in the same manner as in Comparative Example 1, except that the measurement of the amount of the solute Xn was carried out as follows.

The amount of solute Xn present in the diluted draw solution flow e discharged from the unit A was measured as follows, depending on whether the solute Xn was an organic substance or an inorganic salt.

When the solute Xn was an organic substance:

i) the Case of One Type of Organic Substance

The amount of solute Xn was measured as the total organic carbon amount (TOC) using a commercially available TOC measuring device ("TOC-5000" manufactured by Shimadzu Corporation)

ii) the Case of a Plurality of Types of Organic Substances

In addition to the TOC measurement, nuclear magnetic resonance (NMR; model number "ECS-400", manufactured by Japan Electronics Co., Ltd.), and gas chromatography mass analysis (GC/MS, model number "HP6890/5973" manufactured by Agilent Co., Ltd.) were used for measurement, as appropriate, to quantify each component.

When the solute Xn was an inorganic salt: measurement was carried out by the same method as in Comparative Example 1.

The evaluation results of Comparative Examples 11 to 20 are shown in Table 3, and the evaluation results of Examples 16 to 27 and Comparative Examples 21 to 23 are shown in Table 4.

In Table 3 and Table 4, abbreviations in the solute or common solute column have the following meanings.

EtOH: Ethanol

IPA: Isopropanol

EtOAc: Ethyl acetate

βCit: β-citronellol

AcCin: Cinnamyl acetate

AN: Acetonitrile

Ser: L-serine

"Backflow" in the table means that the total amount of the common solute Xn in the feedstock solution flow a after concentration exceeded the total amount of the common solute Xn in the feedstock solution flow a before concentration.

TABLE 3

| | | | Comp Ex 11 | Comp Ex 12 | Comp Ex 13 | Comp Ex 14 | Comp Ex 15 | Comp Ex 16 | Comp Ex 17 | Comp Ex 18 | Comp Ex 19 | Comp Ex 20 |
|---|---|---|---|---|---|---|---|---|---|---|---|---|
| Draw Solution Flow d | Draw Substance Xm | Type | $MgCl_2$ | $MgCl_2$ | $MgCl_2$ | $MgCl_2$ | $MgCl_2$ | $MgCl_2$ | $MgCl_2$ | $MgCl_2$ | $MgCl_2$ | $MgCl_2$ |
| | | Concentration (mass %) | 25 | 25 | 25 | 25 | 25 | 25 | 25 | 25 | 25 | 25 |
| Feedstock Solution Flow a | Common Solute Xn | Type | EtOH | IPA | EtOAc | β-Cit | AcCin | AN | Ser | IPA, AN, Ser | IPA, NaCl | IPA, KCl |
| | | Initial Concentration (mass %) | 5.0 | 5.0 | 5.0 | 5.0 | 5.0 | 5.0 | 5.0 | 5.0, 5.0, 5.0 | 5.0, 5.0 | 5.0, 5.0 |
| Unit A | Elution Suppression Performance of Common Solute Xn | | C | C | C | C | C | C | C | C, C, C | C, C | C, C |

TABLE 4

| | | | Ex 16 | Ex 17 | Comp Ex 21 | Ex 18 |
|---|---|---|---|---|---|---|
| Draw Solution Flow d | Draw Substance Xm | Type | $MgCl_2$ | $MgCl_2$ | $MgCl_2$ | $MgCl_2$ |
| | | Concentration (mass %) | 25 | 25 | 25 | 25 |
| | Common Solute Xn | Type | EtOH | EtOH | IPA | IPA |
| | | Concentration (mass %) | 1.0 | 4.5 | 0.001 | 0.05 |
| Feedstock Solution Flow a | Common Solute Xn | Type | EtOH | EtOH | IPA | IPA |
| | | Initial Concentration (mass %) | 5.0 | 5.0 | 5.0 | 5.0 |
| Unit A | Elution Suppression Performance of Common Solute Xn | | B | A | C | B |
| Common Solute Elution Suppression Performance | Corresponding Comp Ex No. | | Comp Ex 11 | Comp Ex 11 | Comp Ex 12 | Comp Ex 12 |
| | Eval Results | | A | AA | C | B |
| | | | **Ex 19** | **Ex 20** | **Ex 21** | **Ex 22** |
| Draw Solution Flow d | Draw Substance Xm | Type | $MgCl_2$ | $MgCl_2$ | $MgCl_2$ | $MgCl_2$ |
| | | Concentration (mass %) | 25 | 25 | 25 | 25 |
| | Common Solute Xn | Type | IPA | IPA | IPA | EtOAc |
| | | Concentration (mass %) | 0.15 | 0.3 | 4.5 | 4.0 |
| Feedstock Solution Flow a | Common Solute Xn | Type | IPA | IPA | IPA | EtOAc |
| | | Initial Concentration (mass %) | 5.0 | 5.0 | 5.0 | 5.0 |
| Unit A | Elution Suppression Performance of Common Solute Xn | | B | B | A | A |
| Common Solute Elution Suppression Performance | Corresponding Comp Ex No. | | Comp Ex 12 | Comp Ex 12 | Comp Ex 12 | Comp Ex 13 |
| | Eval Results | | B | A | AA | AA |
| | | | **Ex 23** | **Ex 24** | **Ex 25** | **Ex 26** |
| Draw Solution Flow d | Draw Substance Xm | Type | $MgCl_2$ | $MgCl_2$ | $MgCl_2$ | $MgCl_2$ |
| | | Concentration (mass %) | 25 | 25 | 25 | 25 |
| | Common Solute Xn | Type | β-Cit | AcCin | AN | Ser |
| | | Concentration (mass %) | 4.95 | 1.5 | 4.0 | 4.0 |
| Feedstock Solution Flow a | Common Solute Xn | Type | β-Cit | AcCin | AN | Ser |
| | | Initial Concentration (mass %) | 5.0 | 5.0 | 5.0 | 5.0 |
| Unit A | Elution Suppression Performance of Common Solute Xn | | A | A | A | A |

TABLE 4-continued

| | | | | | |
|---|---|---|---|---|---|
| Common Solute Elution Suppression Performance | Corresponding Comp Ex No. | Comp Ex 14 | Comp Ex 15 | Comp Ex 16 | Comp Ex 17 |
| | Eval Results | AA | AA | AA | AA |

| | | | Ex 27 | Comp Ex 22 | Comp Ex 23 |
|---|---|---|---|---|---|
| Draw Solution Flow d | Draw Substance Xm | Type | $MgCl_2$ | $MgCl_2$ | $MgCl_2$ |
| | | Concentration (mass %) | 25 | 25 | 25 |
| | Common Solute Xn | Type | IPA, AN, Ser | IPA, NaCl | IPA, KCl |
| | | Concentration (mass %) | 1.5, 4.0, 4.0 | 5.0, 4.6 | 5.5, 2.9 |
| Feedstock Solution Flow a | Common Solute Xn | Type | IPA, AN, Ser | IPA, NaCl | IPA, KCl |
| | | Initial Concentration (mass %) | 5.0, 5.0, 5.0 | 5.0, 5.0 | 5.0, 5.0 |
| Unit A | Elution Suppression Performance of Common Solute Xn | | A, A, A | Backflow, A | Backflow, A |
| Common Solute Elution Suppression Performance | Corresponding Comp Ex No. | | Comp Ex 18 | Comp Ex 19 | Comp Ex 20 |
| | Eval Results | | AA, AA, AA | Backflow, AA | Backflow, AA |

Comparative Example 24

In Comparative Example 24, enrichment of red wine was carried out using the feedstock solution flow concentration system shown in FIG. 1.

The forward osmosis unit A produced above was used as unit A of the first step.

As the feedstock solution flow a, commercially available red wine (ethanol (EtOH) content=12.0% by volume) was used as-is. Thus, the solvent b of the feedstock solution flow a was water. Water was used as the solvent b of the induction liquid stream d.

As the draw solution flow d, an aqueous solution containing magnesium chloride was used as the draw substance Xm, and the magnesium chloride concentration in the initial draw solution flow d was set to 32% by mass.

In the feedstock solution flow concentration system shown in FIG. 1, in the first step, the feedstock solution flow a was flowed at a flow rate of 120 mL/min and the draw solution flow d was flowed at a flow rate of 236 mL/min into unit A.

The diluted draw solution flow e was then circulated with a circulation pump and re-supplied as the draw solution flow d as-is.

The temperatures of the feedstock solution flow a in the unit A in the first step and the draw solution flow d were 10° C., and operation was carried out for 1 hour.

Comparative Example 25

Concentration of the feedstock solution flow a was carried out according to the same procedure as in Comparative Example 24, except that ethanol was added at a concentration of 20% by volume as the common solute Xn in the feedstock solution flow a together with magnesium chloride as the draw substance Xm in the draw solution flow d.

Example 28

As the draw solution flow d, an aqueous solution obtained by adding magnesium chloride having a concentration of 32 mass % as the draw substance Xm and the same red wine as the feedstock solution flow a was used, and all of the types of solute in the red wine were defined as the common solute Xn. The amount of red wine added to the draw solution flow d was set to be 2.0% by volume in terms of ethanol.

Evaluation (1) Evaluation of Solute Leakage Suppression Performance by Common Solute into Draw Solution Flow d Comparative Example 25 and Example 28 correspond to the case where the common solute Xn was contained in the draw solution flow d of Comparative Example 24. Therefore, for Comparative Example 25 and Example 28, with reference to Comparative Example 24, evaluation of the solute leakage suppressing performance due to the common solute content into the draw solution flow d was carried out by the following method.

Each value of F' was obtained by carrying out "(1) Evaluation of Elution Suppression Performance of Solute Xn in Feedstock Solution Flow a" in the same manner as in Example 16, except that with respect to the concentration of the feedstock solution flow a (red wine), ethanol was selected as the solute Xn, measurement of the amount was carried out by a method described later, and the evaluation criteria were changed as follows. Using the value of Z1 calculated by formula (2) in "(2) Evaluation of Solute Leakage Suppression Performance due to Common Solute Inclusion into Draw Solution Flow d" in Example 16, evaluation was carried out by the following criteria.

A: the value of Z1 was 80% or less (suitable)

C: the value of Z1 was greater than 80% and less than or equal to 100% (poor)

Backflow: the value of Z1 exceeded 100% (extremely poor)

(2) Evaluation of Solute Component Balance Maintenance

Seven solute components, ethanol, and six organic acids (tartaric, citric, malic, lactic, succinic, and acetic acids), were selected as solutes in red wine.

Before and after concentration of red wine, the concentrations of these seven components were measured by a method described later to determine the composition ratio. This composition ratio was based on mass, and was determined as a value normalized so that the sum of the seven components was 100. Thus, for the red wine before concentration and after concentration, the mass ratio of each component was calculated in units of percentage (%).

For each component, a difference (% pt) between the mass ratio (%) before concentration and the mass ratio (%) after concentration was determined and evaluated by the following criteria.

A: for all seven components, the difference in the mass ratio (%) before and after concentration was 5 (% pt) or less (suitable)

C: there is one or more components with a difference in mass ratio (%) of more than 5 (% pt) before and after concentration (poor)

Analysis of the amount of ethanol in "(1) Evaluation of Solute Leakage Suppression Performance by Common Solute into Draw Solution Flow d" and "(2) Evaluation of Solute Component Balance Maintenance" described above was carried out using a rapid alcohol measurement kit manufactured by Kyoto Electronics Industry Co., Ltd., and a product name "SD-700", respectively.

Analysis of the amount of organic acid in "(2) Evaluation of Solute Component Balance Maintenance" described above was carried out with a calibration curve method using an HPLC.

(3) Sensory Evaluation

Pure water was added to each of the concentrated red wines (concentrated feedstock solution flow c) obtained in Comparative Examples 24 and 25 and Example 28 for dilution so that the ethanol concentration became a numerical value (12.0% by volume) before concentration to obtain a concentrated reduced red wine.

Six evaluators were allowed to taste these concentrated reduced red wines and pre-concentrated red wines to assess astringency, sweetness, and maintenance of alcohol balance, and the wines were evaluated on the following criteria:

3 points: the balance between astringency, sweetness, and alcohol was maintained 1 point: the balance between astringency and sweetness was maintained, but the balance of alcohol was lost 0 points: the balance between astringency, sweetness, and alcohol was lost For each of the Comparative Examples and the Examples, the total score obtained by adding the scores of the six evaluators was evaluated on the basis of the following criteria.

A: A total score of 15 points or more (good)

B: A total score of 10 points to 14 points (poor)

C: A total score of 9 points or less (extremely poor)

The above results are shown in Table 5.

TABLE 5

| | | | Comp Ex 24 | Comp Ex 25 | Ex 28 |
|---|---|---|---|---|---|
| Draw Solution Flow d | Draw Substance Xm | Type | $MgCl_2$ | $MgCl_2$ | $MgCl_2$ |
| | | Concentration (mass %) | 32 | 32 | 32 |
| | Common Solute Xn | Type | — | EtOH | Total Common Solute in Red Wine |
| | | Concentration (vol %) | — | 20.0 | EtOH Conversion 2.0 |
| Feedstock Solution Flow a | Feedstock Solution Type | | Red Wine | Red Wine | Red Wine |
| | Typical Common Solute Xn | Type | EtOH | EtOH | EtOH |
| | | Initial Concentration (vol %) | 12.0 | 12.0 | 12.0 |
| Common Solute Elution Suppression Performance | Corresponding Comp Ex No. | | — | Comp Ex 24 | Comp Ex 24 |
| | Eval Results | | — | C | A |
| Component Balance Maintenance | | | C | C | A |
| Sensory Evaluation | | | C | B | A |

(the end of TABLE 5)

REFERENCE SIGN LIST a feedstock solution flow
b solvent
c concentrated feedstock solution flow
d draw solution flow
e diluted draw solution flow
f concentrated draw solution flow
Xn common solute
Xm draw substance
o forward osmosis membrane
p semipermeable membrane
q1 heat exchanger
q2 cooling device
r1, r2 feed pump
D draw solution flow-side space
G gas phase
L liquid phase
R feedstock solution flow-side space

The invention claimed is:

1. A feedstock solution flow concentration method, comprising a first step for counterflowing or parallel flowing a feedstock solution flow containing at least a solute and a solvent and a draw solution flow via a forward osmosis membrane and transferring the solvent in the feedstock solution flow to the draw solution flow to obtain a concentrated feedstock solution flow, which is the feedstock solution flow which has been concentrated, and a diluted draw solution flow, which is the draw solution flow which has been diluted, wherein the feedstock solution is a pharmaceutical composition, and the number average molecular weight of the solute contained in the feedstock solution is 100 or more, the draw solution flow contains a draw substance and a solvent, the solvents of the feedstock solution flow and the draw solution flow both contain water, the feedstock solution flow and the draw solution flow each further contains a common solute, the common solute is a solute which is common between the feedstock solution flow and the draw solution flow, the concentration of the common solute in the draw solution flow is 1% to less than 100% of the concentration of the common solute in the feedstock solution flow, and the draw solution flow is prepared by dissolving or dispersing the common solute and the draw substance in the solvent of the draw solution flow before the first step.

2. The method according to claim 1, wherein the number average molecular weight of the common solute is 15,000 or less.

3. The method according to claim 1, wherein the common solute further comprises:

a cation having at least one element selected from the group consisting of sodium, magnesium, phosphorus, potassium, calcium, chromium, manganese, iron, cobalt, copper, zinc, selenium, and molybdenum, and an anion having at least one element selected from the group consisting of oxygen, sulfur, nitrogen, chlorine, and iodine.

4. The method according to claim 1, wherein the concentration of the common solute in the draw solution flow is 6% to 96% of the concentration of the common solute in the feedstock solution flow.

5. The method according to claim 1, further comprising a second step in which a solvent is separated from the draw solution flow to obtain a concentrated draw solution flow, which is the draw solution flow which has been concentrated.

6. The method according to claim 1, wherein the forward osmosis membrane is used in the form of a forward osmosis membrane module constituted by a fiber bundle of a plurality of hollow fibers.

7. The method according to claim 6, wherein the forward osmosis membrane is composite hollow fiber having an active separation layer composed of a thin polymer membrane on an inner surface of a hollow fiber porous support membrane.

8. The method according to claim 7, wherein the porous support membrane consists of polyethersulfone or polysulfone, or both of them, and the active separation layer is composed of a thin polymer membrane of polyamide.

9. The method according to claim 1, wherein the concentration of the common solute in the draw solution flow is 6% to 96% of the concentration of the common solute in the feedstock solution flow, the forward osmosis membrane is used in the form of a forward osmosis membrane module constituted by a fiber bundle of a plurality of hollow fibers, the forward osmosis membrane is a composite hollow fiber having an active separation layer composed of a thin polymer membrane on an inner surface of a hollow fiber porous support membrane, the porous support membrane consists of polyethersulfone or polysulfone, or both of them, and the active separation layer is composed of a thin polymer membrane of polyamide.

10. The method according to claim 1, wherein the common solute is selected from the group consisting of sodium chloride, potassium chloride, magnesium chloride, calcium chloride, sodium sulfate, magnesium sulfate, sodium thiosulfate, sodium sulfite, ammonium chloride, ammonium sulfate, and ammonium carbonate, n-butanol, isopropanol, nitromethane, ethanol, methanol, acetic acid, N-methylpyrrolidone, tetrahydrofuran, acetone, dimethylformamide, acetonitrile, and dimethyl sulfoxide.

11. The method according to claim 1, wherein the number average molecular weight of the solute contained in the feedstock solution is 6,000 or less.

12. A feedstock solution flow concentration method, comprising a first step for counterflowing or parallel flowing a feedstock solution flow containing at least a solute and a solvent and a draw solution flow via a forward osmosis membrane and transferring the solvent in the feedstock solution flow to the draw solution flow to obtain a concentrated feedstock solution flow, which is the feedstock solution flow which has been concentrated, and a diluted draw solution flow, which is the draw solution flow which has been diluted, wherein the feedstock solution is a pharmaceutical composition, and the number average molecular weight of the solute contained in the feedstock solution is 100 or more, the draw solution flow contains a draw substance, a common solute, and a solvent, the solvents of the feedstock solution flow and the draw solution flow both contain water, the feedstock solution flow and the draw solution flow each further contains a common solute, the common solute is a solute which is common between the feedstock solution flow and the draw solution flow, the concentration of the common solute in the draw solution flow is 1% to less than 100% of the concentration of the common solute in the feedstock solution flow, and the concentration of the common solute in the feedstock solution flow is 5 mass % or more.

13. The method according to claim 12, wherein the number average molecular weight of the common solute is 15,000 or less.

14. The method according to claim 12, wherein the common solute further comprises:

a cation having at least one element selected from the group consisting of sodium, magnesium, phosphorus, potassium, calcium, chromium, manganese, iron, cobalt, copper, zinc, selenium, and molybdenum, and an anion having at least one element selected from the group consisting of oxygen, sulfur, nitrogen, chlorine, and iodine.

15. The method according to claim 12, wherein the concentration of the common solute in the draw solution flow is 6% to 96% of the concentration of the common solute in the feedstock solution flow.

16. The method according to claim 12, further comprising a second step in which a solvent is separated from the draw solution flow to obtain a concentrated draw solution flow, which is the draw solution flow which has been concentrated.

17. The method according to claim 12, wherein the forward osmosis membrane is used in the form of a forward osmosis membrane module constituted by a fiber bundle of a plurality of hollow fibers.

18. The method according to claim 17, wherein the forward osmosis membrane is composite hollow fiber having an active separation layer composed of a thin polymer membrane on an inner surface of a hollow fiber porous support membrane.

19. The method according to claim 18, wherein the porous support membrane consists of polyethersulfone or polysulfone, or both of them, and the active separation layer is composed of a thin polymer membrane of polyamide.

20. The method according to claim 12, wherein the concentration of the common solute in the draw solution flow is 6% to 96% of the concentration of the common solute in the feedstock solution flow, the forward osmosis membrane is used in the form of a forward osmosis membrane module constituted by a fiber bundle of a plurality of hollow fibers, the forward osmosis membrane is a composite hollow fiber having an active separation layer composed of a thin polymer membrane on an inner surface of a hollow fiber porous support membrane, the porous support membrane consists of polyethersulfone or polysulfone, or both of them, and the active separation layer is composed of a thin polymer membrane of polyamide.

21. The method according to claim 12, wherein the common solute is selected from the group consisting of sodium chloride, potassium chloride, magnesium chloride, calcium chloride, sodium sulfate, magnesium sulfate, sodium thiosulfate, sodium sulfite, ammonium chloride, ammonium sulfate, and ammonium carbonate, n-butanol, isopropanol, nitromethane, ethanol, methanol, acetic acid, N-methylpyrrolidone, tetrahydrofuran, acetone, dimethylformamide, acetonitrile, and dimethyl sulfoxide.

22. The method according to claim 12, wherein the number average molecular weight of the solute contained in the feedstock solution is 6,000 or less.

* * * * *